United States Patent
Douglass

(10) Patent No.: US 8,065,849 B2
(45) Date of Patent: Nov. 29, 2011

(54) DECKING PLANK

(76) Inventor: James Edward Douglass, Ryton-on-Dunsmore (GB)

(*) Notice: Subject to any disclaimer, the term of this patent is extended or adjusted under 35 U.S.C. 154(b) by 496 days.

(21) Appl. No.: 12/094,106

(22) PCT Filed: Nov. 15, 2006

(86) PCT No.: PCT/GB2006/004250
§ 371 (c)(1),
(2), (4) Date: May 16, 2008

(87) PCT Pub. No.: WO2007/060392
PCT Pub. Date: May 31, 2007

(65) Prior Publication Data
US 2008/0282638 A1    Nov. 20, 2008

(30) Foreign Application Priority Data

Nov. 24, 2005  (GB) .................................. 0523912.4
Mar. 25, 2006  (GB) .................................. 0606030.5

(51) Int. Cl.
*E04C 1/00* (2006.01)
(52) U.S. Cl. .................................................... 52/309.9
(58) Field of Classification Search .......... 52/177, 52/181, 309.13, 309.15, 309.16, 188, 309.9; 15/238; 428/317.9, 318.6, 319.3, 319.7, 428/319.9, 326, 330, 423.3, 511–520, 534, 428/535
See application file for complete search history.

(56) References Cited

U.S. PATENT DOCUMENTS

| | | | |
|---|---|---|---|
| 3,705,072 A * | 12/1972 | Rosvold | 428/354 |
| 4,555,292 A | 11/1985 | Thompson | |
| 5,160,772 A * | 11/1992 | Futami et al. | 428/71 |
| 5,190,799 A | 3/1993 | Ellingson, III | |
| 5,633,063 A * | 5/1997 | Lause et al. | 428/71 |
| 5,660,016 A | 8/1997 | Erwin et al. | |
| 5,713,165 A | 2/1998 | Erwin | |
| 6,044,598 A | 4/2000 | Elsasser et al. | |
| 6,427,395 B1 | 8/2002 | Elsasser et al. | |
| 6,579,605 B2 * | 6/2003 | Zehner | 428/319.9 |
| 6,605,343 B1 * | 8/2003 | Motoi et al. | 428/298.1 |
| 6,958,185 B1 * | 10/2005 | Zehner | 428/317.9 |
| 7,208,536 B2 * | 4/2007 | Lim et al. | 524/262 |
| 2004/0050007 A1 | 3/2004 | Curatolo | |
| 2004/0062922 A1 * | 4/2004 | Sunde | 428/319.3 |
| 2005/0281986 A1 * | 12/2005 | Nam | 428/172 |
| 2006/0130416 A1 * | 6/2006 | Mohr et al. | 52/403.1 |
| 2007/0289234 A1 * | 12/2007 | Carlson et al. | 52/309.7 |
| 2009/0104407 A1 * | 4/2009 | Johnson et al. | 428/141 |

FOREIGN PATENT DOCUMENTS

| | | |
|---|---|---|
| CA | 2 370 583 A1 | 8/2002 |
| EP | 0 217 989 A1 | 4/1987 |
| EP | 1 104 830 A2 | 6/2001 |
| EP | 1 264 946 A1 | 12/2002 |

(Continued)

*Primary Examiner* — Eileen D Lillis
*Assistant Examiner* — Theodore Adamos
(74) *Attorney, Agent, or Firm* — Workman Nydegger

(57) ABSTRACT

A decking plank (1) comprising a core (2) which acts as a support beam, one or more layers (3,4) bonded to said core without the use of releasable attachment means and one or the layer being an outer slip resistant covering layer with a relief; characterised in that at least one of said layers (3) is relatively soft compared to said core which is relatively hard; whereby the core acts as a support beam and said at least one layer has a cushioning effect.

14 Claims, 9 Drawing Sheets

FOREIGN PATENT DOCUMENTS

| | | |
|---|---|---|
| GB | 394593 | 6/1933 |
| GB | 1 423 146 | 1/1976 |
| GB | 2 382 598 A1 | 6/2003 |
| JP | 4-228767 | 8/1992 |
| JP | 9-100615 | 4/1997 |
| JP | 10-193962 | 7/1998 |
| NL | 7014057 | 3/1973 |
| NL | 7603169 | 3/1976 |
| WO | WO 98/26140 | 6/1998 |

* cited by examiner

A

B

DECKING PLANK

FIELD OF THE INVENTION

The invention relates to decking planks.

In this specification the term "decking plank" means a decking plank which is capable of being suspended on two or more support points without significantly bending out of the natural plane of the plank when carrying a weight such as a person. It does not necessarily require to be laid flat on a floor in order to substantially retain its shape.

BACKGROUND TO THE INVENTION AND PRIOR ART KNOWN TO THE APPLICANT

The following prior art documents are acknowledged:
JP10193962;
JP09100615;
GB1423146;
EP1104830;
GB2382598;
JP04228767;
U.S. Pat. No. 6,427,395;
U.S. Pat. No. 6,044,598;
WO98/26140;
U.S. Pat. No. 5,713,165;
U.S. Pat. No. 5,660,016; and
CA2370583.

Some of these prior art documents will not be suitable for use as a decking plank because they are designed to necessarily be laid flat against the floor in order to be fully supported along their length. Other embodiments in the prior art are concerned with protecting a beam support suitable for a decking plank that necessarily requires releasable attachment means. Other prior art embodiments are concerned with applying layers for the protection of a support beam where the layers are not homogeneous as being constituted for example of a mixture of resin and glass solid spheres.

SUMMARY OF THE INVENTION

In a first broad independent aspect, the invention provides a decking plank comprising a core which acts as a support beam; one or more layers bonded to said core without the use of releasable attachment means and one or the layer being an outer slip resistant covering layer with a relief; characterised in that at least one of said layers is relatively soft compared to said core which is relatively hard; whereby the core acts as a support beam and said at least one layer has a cushioning effect.

This configuration reverses conventional thinking in the field of decking planks as expressed in U.S. Pat. No. 5,660,016 where a relatively hard outer shell protects a relatively soft inner portion. This configuration is particularly advantageous because it allows splinter free decking to be produced which may also be made to resemble real wood or natural stone while simultaneously being both slip resistant and cushioned in order to be particularly comfortable and risk free to stand on. It will also have fewer tendencies of fungi growing on the deck particularly when the layers are of plastics material. The covering may also achieve fire resistance when compared to conventional decking which is often coated with a flammable varnish. The slip resistance of the plank will be particularly advantageous when the surface is wet. Whilst the decking plank may resemble real wood it is also particularly advantageous because it may be configured to resemble natural stone or clay tiles or the like.

In a subsidiary aspect in accordance with the invention's first broad independent aspect, the or each layer is (or are) homogeneous. This configuration is particularly advantageous because it avoids the surface being abrasive or uncomfortable at least underneath the foot of the user as would be the case for the prior art non-homogeneous mixtures for example, where a mixture of resin and glass solid spheres were suggested. It also allows the relief to have natural-looking and soft-feeling depressions and projections. In a further subsidiary aspect, the core of the plank is reinforced by fibres. This would allow the core to be strengthened to act as the main support for the decking plank to allow it to undergo the necessary bending moments when supported between two joists.

In a further subsidiary aspect, said core is a support beam. This would allow the layers to be cast over a pre-existing support beam. This would avoid for example using particularly weather resistant support beams since the layers would protect the support beam against weathering.

In a further subsidiary aspect, said supporting beam is of extruded plastics with tunnels through the beam. This would allow for example electrics to be placed through the beam in predetermined positions. It would also render the decking plank relatively light compared to entirely filled planks.

In a further subsidiary aspect, said plank has at least a top surface and a side surface which is covered by said one or more layers. This configuration is particularly advantageous because it protects not only the top surface but the side surface and therefore further minimises any risk of slippage on the edges or of splinters when handling the plank.

In a further subsidiary aspect, said core is entirely encapsulated in a layer with cushioning effect. This provides the advantage of further increasing the versatility of the plank, its ease of handling and its properties irrespective of which side a deck installer chooses to install the plank.

In a further subsidiary aspect, the decking plank further comprises a plurality of layers; wherein one covering layer is of so-called "filled elastomer" and an outermost layer is of greater wear resistance with less filler than said layer or no filler at all. This configuration is particularly advantageous because it maximises the wear resistance of the plank, improves its cushioning effect whilst simultaneously reducing the costs of the material for production purposes.

In a further subsidiary aspect, said plurality of layers are melded together without the use of adhesives. This configuration is particularly advantageous because it allows the layers to act as their own adhesives without the use of separate adhesives as the layers set together during the manufacturing process.

In a further subsidiary aspect, one or more layers are of a resilient foam material. This optional feature assists in achieving a cushioned feel to the decking plank as well as retaining the advantages discussed above in connection with the previous aspects.

In a further subsidiary aspect said core is a wood-based support beam which has been treated against damp induced rot. This is advantageous because it allows the plank to be used for prolonged periods in a humid environment such as a garden.

In a further subsidiary aspect, the plank further comprises multiple lateral projections on at least one side of the plank and recesses on at least one opposite side of the plank for mating engagement with the lateral projections of another plank. This optional configuration is particularly advantageous because it not only allows neighbouring planks to be secured to one another but it also allows them to be secured in predetermined relative positions so that no horizontal adjustment is required.

In a further subsidiary aspect, said plank further comprises heating means. This configuration is particularly advantageous because it allows decking planks which are suitable for use outdoors (or indoors) to thaw any ice or snow accumulating on the deck. It also allows the deck to be used in cold temperatures so that users in the vicinity of the deck may be warmed by the deck itself. Such decks may become complimentary to gas fired patio warmers or even render these redundant.

In a further subsidiary aspect, said supporting core is a beam whose underside incorporates open troughs separated by substantially vertical (in use) webs. This configuration is particularly advantageous because it reduces the overall weight of the decking plank whilst maintaining its strength. The exposed troughs also allow electrical wiring to be fitted and effectively hidden by the plank even after the planks have been installed.

In a further subsidiary aspect, one or more of the plank's sides incorporates or incorporate grooves. This would be particularly advantageous because it would accommodate hidden fixing.

In a second broad independent aspect, the invention provides a decking plank comprising a support beam, characterised in that said decking plank further comprises heating means. This combination of features is particularly advantageous because it allows decking planks which are suitable for use outdoors (or indoors) to thaw any ice or snow accumulating on the deck. It also allows the decking to be used in cold temperatures so that users in the vicinity of the deck may be warmed by the deck itself.

In a subsidiary aspect, in accordance with the invention's second broad independent aspect, said support beam incorporates grooves in which said heating means are placed so would allow the heating means to be accurately located within the plank.

In a further subsidiary aspect, the top portion of the plank is covered by a layer which is relatively soft compared to the support beam. This feature is particularly advantageous because it allows the decking plank to feel softer to a user which will further increase his/her comfort as well as avoiding the risk of injury from accidentally rubbing against a hard top or receiving splinters from a wooden decking plank.

In a further subsidiary aspect, said encapsulating layer acts as a cushion. This would also be particularly advantageous in terms of comfort for a user and would further reduce any risk of user accidents.

In a further subsidiary aspect, said heating means are electrical heating means and the plank incorporates either recessed or projecting or both recessed and projecting electrical contacts to allow the location of neighbouring planks and electrical contact between neighbouring planks.

In a further subsidiary aspect, the plank comprises a covering layer and the top surface of the plank incorporates recessed portions in a covering layer indicating suitable locations for the insertion of one or more screws or the like.

This avoids a user inadvertently severing the heating means during installation of the deck. It also avoids any requirement of having to use warning stickers indicating where it would not be suitable to insert screws. Alternatively, a template may be provided.

In a further subsidiary aspect, said decking plank incorporates a covering layer and lighting means embedded into said covering layer. The covering layer can, for example, serve as a waterproof barrier to prevent the corrosion of the lighting means. This configuration can also limit breakage of the lighting means.

In a further subsidiary aspect, said decking plank incorporates a covering layer and alarm components embedded into said covering layer. This would allow the alarm components to be protected from corrosion and from breakage whilst adding a potential invisible extra safety component to a decking plank.

In a third broad independent aspect, the invention provides a method of producing a decking plank, comprising the steps of:
  selecting a support beam and an electrical component;
  placing said support beam and electrical component in a mould;
  filling said mould in order to cover said electrical component; and
  removing said cast decking plank from said mould.

This method is particularly advantageous because it allows as many electrical components as necessary to be placed and secured in close proximity to a support beam of a decking plank. It provides protection for electrical components against corrosion and accidental damage. It also prevents accidental harm occurring to users of the deck.

In a fourth broad independent aspect, the invention provides a decking plank comprising a support beam, one or more electrical components secured to said decking plank, a covering layer cast onto said support beam and one or more electrical components; whereby said covering layer secures said electrical components in position. This configuration also allows a wide variety of electrical components being placed in a wide variety of locations. It also allows the electrical components to be protected whilst avoiding them causing damage to the users of the deck.

DETAILED DESCRIPTION OF THE FIGURES

Figure 1:
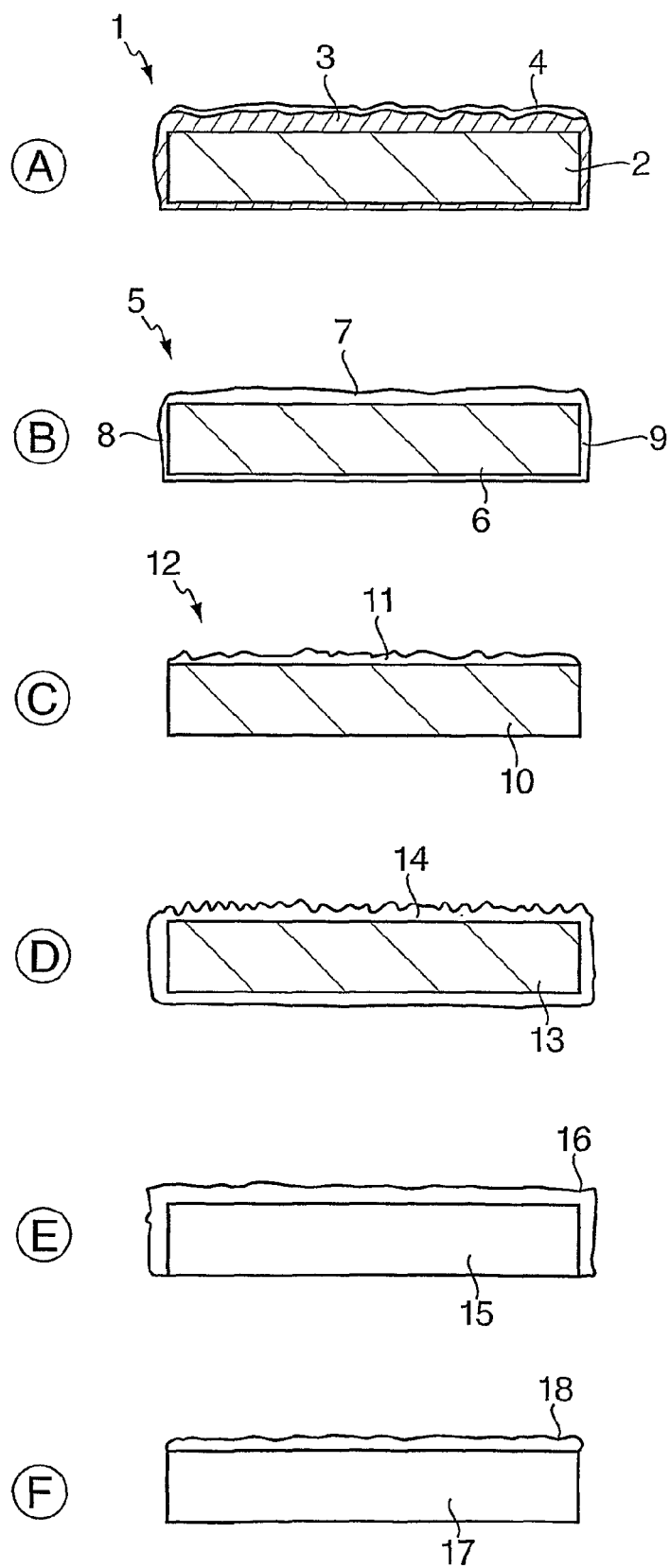
FIGS. 1a to 1f show four separate embodiments of a decking plank in cross-section.
Figure 13:
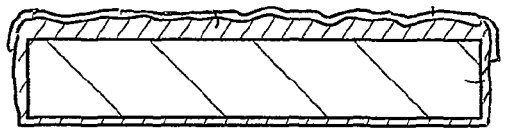
FIG. 13 shows a cross-sectional view of a decking plank in accordance with a further embodiment of the invention.
Figure 14:
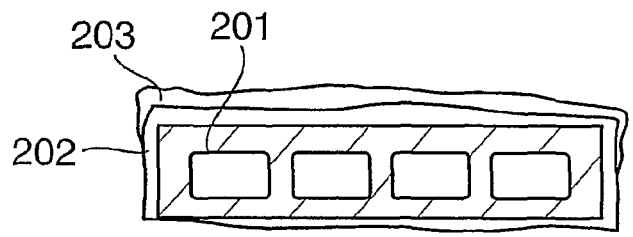
FIG. 14 shows a cross-sectional view of a decking plank in accordance with a further embodiment of the invention.

FIG. 1a shows a decking plank 1 in cross-section. This decking plank has a substantially rectangular cross-section with a substantially rigid support beam 2, encapsulated in a covering layer 3. On top of the covering layer 3, a further covering layer 4 is provided which extends only across the top surface of the plank. The embodiment shown in FIG. 13 shows the further covering layer of the embodiment of FIG. 1a extending at least partially down the sides and/or ends of the plank. Alternatively, the further covering layer may extend all down the sides and/or ends of the plank. The support beam forms a strong hard core to support foot fall. The support beam may be of timber, plywood or an extruded material such as an extruded beam made out of plastics. FIG. 1a shows a support beam without a hollow core in order to allow the screwing and retention of a screw into the covering layers and support beam. Alternatively, as shown in FIG. 14, a hard core may be hollow with a number of tunnels such as tunnel 201. Layer 202 encapsulates the hard core as in previous embodiments and an upper layer 203 with a softer walking surface is provided.

Returning to the description of FIG. 1a, layer 3 may be a "filled elastomer". The elastomer may preferably be of polyurethane. The filler is for example, pulverised fuel ash. It may also for example include calcium carbonate.

The upper layer 4 may be of a purer polyurethane material so as to have a greater resistance to wear. The upper layer of the decking material may incorporate an array of troughs and peaks which may also take the shape of the grains of an antique piece of wood or a natural stone, clay tiles or the like. The shape of the plastics material of the covering layers may be achieved by using appropriate moulds into which the plastics material is injected around the plank of timber for example, and once set, is removed to reveal the relief of the top surface. The relief of the softer top surface will also assist in the non-slip properties of the covering layers. The "filled polyurethane" may be blown.

As an alternative to the embodiment of FIG. 1a, FIG. 1b shows a decking plank 5, with a support beam 6 entirely encapsulated within a single layer of homogeneous covering material 7, which may be of the "blown" type with "filled polyurethane".

Side portions 8 and 9 of the plank are covered by the plastics material. The invention envisages embodiments where only the top surface of the supporting beam and side portions 8 and 9 are covered by the protective material.

In a further embodiment, FIG. 1c shows a support beam 10 and an upper top surface only covering layer 11 which together form a decking plank 12. The upper layer 11 may be cast on top of the support beam or alternatively glued onto the support beam.

FIG. 1d shows a support beam 13 which may be of a laminate timber kind covered by a covering layer 14 entirely encapsulating the support beam. In this embodiment, the upper surface may be a soft surface when compared to traditional timber. It will nevertheless retain the looks of real wood and will be classified as slip-resistant particularly due to the relief. The plastics material used may be selected to have fire-resistant/fire retardant properties.

FIG. 1E shows a decking plank comprising a support beam 15 and a covering layer 16 of cushion material applied to the top, sides, and end portion of the beam only. This configuration is particularly advantageous to firstly reduce cost of the overall item by reducing the amount of covering material used, and secondly to allow a resilient, and perhaps decorative and non-slip layer to be used on exposed parts, whilst providing a non-resilient surface (the "bottom") to allow firm fixing to a sub-structure.

FIG. 1F illustrates a decking plank wherein the structural support beam 17 is itself comprised of a filled elastomer, such as polyurethane, i.e. without a wooden core. One or more surfaces of the plank have a covering layer, 18, as above.

The plastics material used may be selected to have fire-resistant/fire retardant properties.

Figure 15:
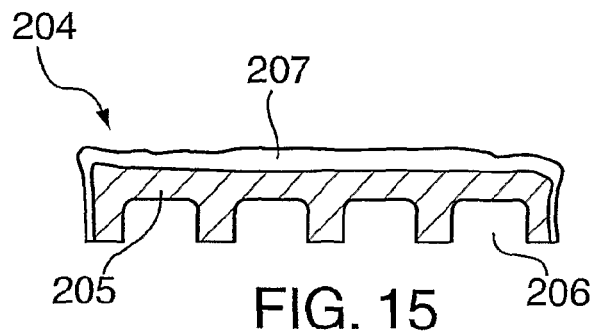
FIG. 15 shows a cross-sectional view of a decking plank in accordance with a further embodiment of the invention.

FIG. 15 shows a decking plank generally referenced 204 with a hard core 205 which may be an extruded plastics beam with on its lower portion a number of longitudinal troughs 206. Over the top and side surfaces of the hard core, there is provided a softer walking surface 207. The harder core may be cast into the softer "face".

Figure 16:
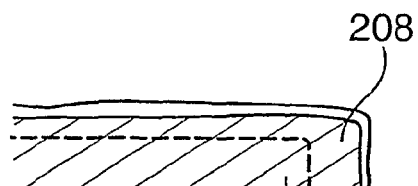
FIG. 16 shows a cross-sectional view of a decking plank in accordance with a further embodiment of the invention.

As can be seen in FIG. 16, trough 206 is closed towards the ends such as end 208. FIG. 16 also shows that top layer 207 also covers the end as well as the sides in this embodiment.

The invention also envisages a retro-fittable sheet shaped and configured to fit over the top surface of a decking plank and its side surfaces which may be glued or stapled to a support beam.

It is also envisaged that an outer colour resistant layer is provided.

Furthermore, the invention envisages the incorporation of both heating and lighting in the same decking board plus optionally an alarm in the same decking board.

Figure 17:
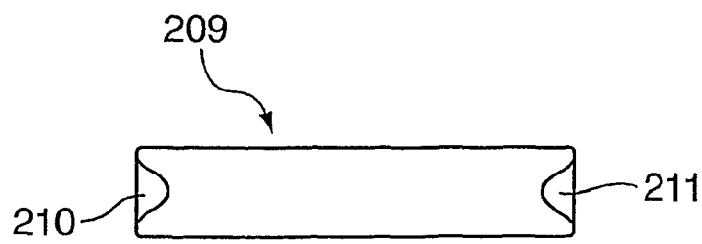
FIG. 17 shows a cross-sectional view of a decking plank in accordance with a further embodiment of the invention.

FIG. 17 shows a further decking plank generally referenced 209 with side grooves 210 and 211. The grooves may be located in one of both sides to accommodate hidden fixing.

The decking plank of the invention does not necessarily need to have a separate wooden or metallic support beam. It may be sufficient for layer 202 for example, to be strong enough on its own. In other words, the filled "encapsulating resin" may be strengthened by, for example, the use of fibres or any other appropriate strengthening material.

Furthermore, the covering of the decking plank may preferably have a Shore factor (A) within the range of around 20 to around 90 Shore (A).

Figure 2:
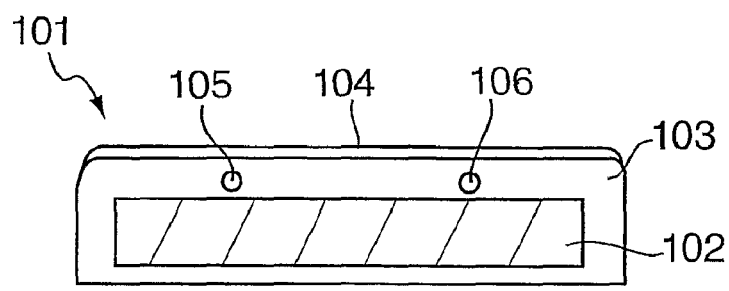
FIG. 2 shows a cross-sectional view of a further embodiment of a decking plank.

FIG. 2 shows a decking plank generally referenced 101 with a support beam 102 and a covering layer 103. The covering layer 103 may be a "filled elastomer". The elastomer may be of polyurethane. The filler is for example, pulverised fuel ash. It may, for example, include or be of calcium carbonate. The upper layer 104 which covers only the top portion of the decking plank may be of a purer polyurethane material so as to have greater resistance to wear and to achieve a cushioning feeling when compared to a layer which would not be of such purity of polyurethane.

The upper layer of decking material may incorporate an array of troughs and peaks that may also take the shape of the grains of an antique piece of wood, or natural stone, or clay tile. The array of troughs may be designed to avoid the electrical heating wires 105 and 106 so that the user when given instructions to insert screws only into pre-recessed portions of the decking plank would avoid any damage occurring to the electrical heating wires. Whilst electrical heating wires have been illustrated, other forms of heat exchangers are envisaged such as an arrangement of pipes for transmitting heat from a circulating fluid. In the summer such a heating arrangement may also be used as a solar panel.

The support beam 102 may be devoid of any chemicals which are typical in decking planks to allow them to be preserved in the outside environment. This is because the elastomer itself can act as a barrier and protect the decking plank.

Figure 3:
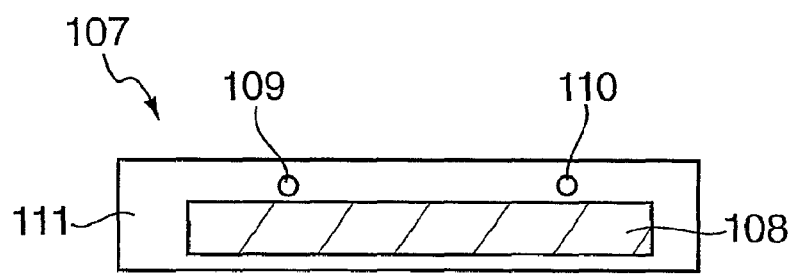
FIG. 3 shows a cross-sectional view of a further decking plank.

FIG. 3 shows a decking plank 107 with a support beam 108, and two electrical wires 109 and 110. The wires 109 and 110 may be a single wire which loops around the top surface of the support beam. The covering layer may be a hard plastic layer. The electrical components are shown on the top half only of the decking plank in this embodiment.

Figure 4:
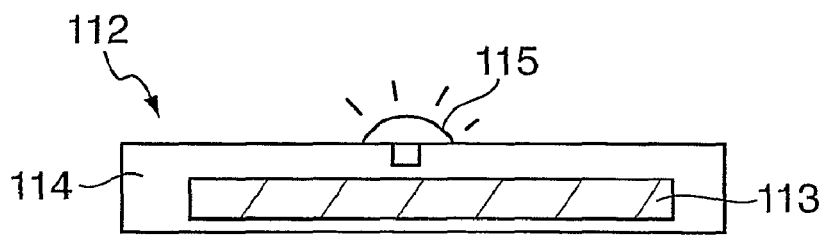
FIG. 4 shows a cross-sectional view of a further decking plank.

FIG. 4 shows a decking plank 12 with a support beam 113 and an encapsulating covering layer 114 in which a light source 115 is embedded. The light source is in fact partially within the layer and partially outside the layer.

Figure 5:
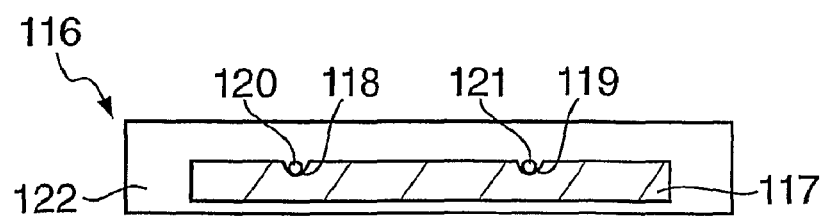
FIG. 5 shows a cross-sectional view of a further decking plank.

FIG. 5 shows a decking plank 116 with a support beam 117 with a number of grooves such as grooves 118 and 119 in which are provided recessed electrical components 120 and 121. A covering layer 122 entirety encapsulates the support beam in order to provide an environmental barrier between the support beam and the outside environment. The covering layer also entirely masks the presence of the electrical components.

Figure 6:
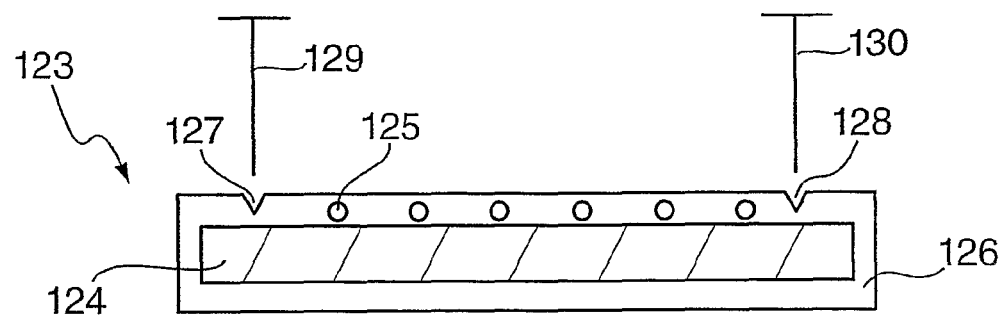
FIG. 6 shows a cross-sectional view of a further decking plank.

FIG. 6 shows a decking plank 123 with a support beam 124 and a number of wire portions 125, set within an encapsulating layer 126. The layer incorporates a number of outer recess portions 127 and 128 which mark the location for the insertion for the screws 129 and 130.

Figure 7:
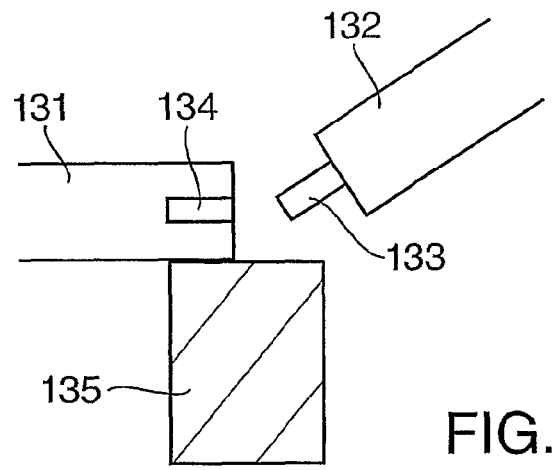
FIG. 7 shows a part cross-sectional view of an arrangement of decking planks on a joist with an electrical contact projection and an electrical contact recess to permit location and electrical contact between neighbouring planks. The planks of FIG. 7 are in accordance with a further embodiment of the invention.

When the screws 129 and 130 are inserted at these locations, they avoid accidentally severing the electrical components 125 in FIG. 7. Two side portions 131 and 132 of neighbouring decking planks are illustrated which respectively incorporate a projecting member 133 and a recess 134. Electrical contact means are also envisaged at appropriate locations of the recess 134 and projection 133 to allow electrical currents to pass across the junction between neighbouring planks. The projection and recess arrangements shown also allow neighbouring planks to be securely fitted onto each other. It is also envisaged to support the planks on joists such as joist 135.

Figure 8:
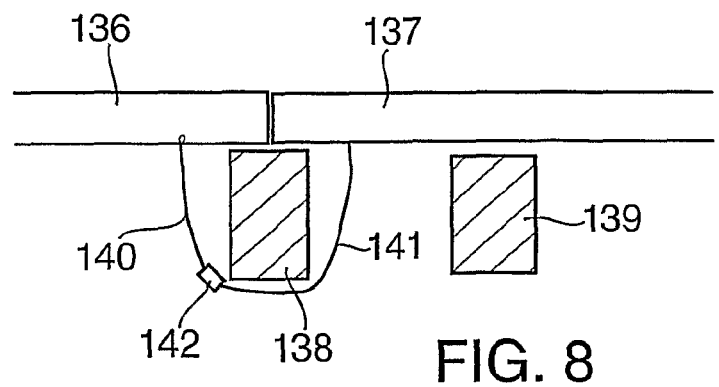
FIG. 8 shows an arrangement of neighbouring decking planks in part cross-sectional view with an exposed cable connector between neighbouring planks. The decking planks of FIG. 8 are in accordance with the seventh embodiment of the invention.

FIG. 8 shows neighbouring decking plank portions 136 and 137 supported on joists 138 and 139. Exiting from the underneath regions of the decking plank portions are wires 140 and 141 allowing an electrical contact to be achieved across neighbouring planks. A releasable external connector 142 is provided at the end of wires 140 and 141.

Figure 9:
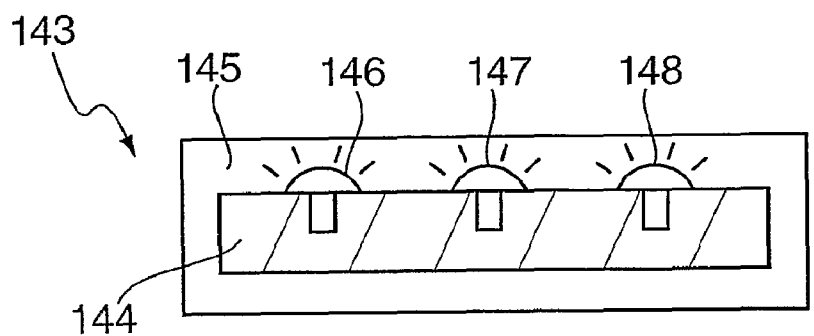
FIG. 9 shows a decking plank in cross-sectional view in accordance with a further embodiment of the invention.

FIG. 9 shows the decking plank 143 with a support beam 144 and a covering layer 145 which is of translucent plastics material. The lighting sources 146, 147 and 148 are each entirely located within the covering layer 145.

Figure 10:
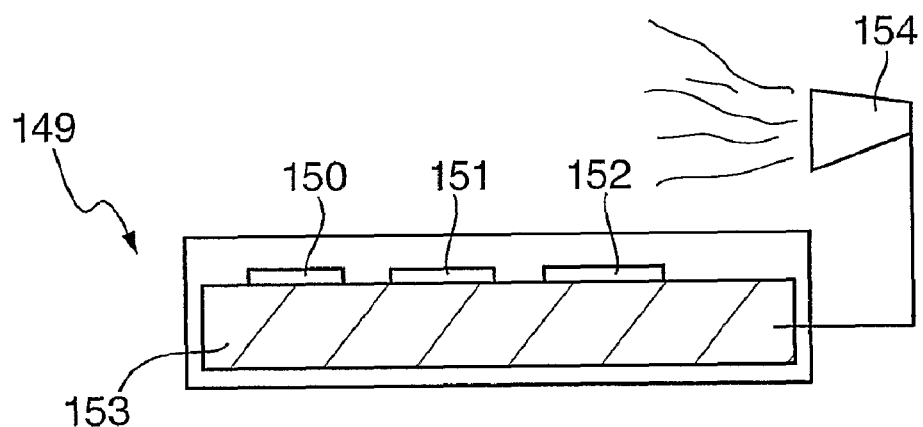
FIG. 10 shows a further cross-sectional view of a decking plank in accordance with a further embodiment of the invention.

FIG. 10 shows a decking plank 149 with an arrangement of sensors 150, 151 and 152 located on the top surface of the support beam 153. The sensors may be suitable to arrange the triggering of an alarm 154 when, for example, they sense that a certain weight is placed on the decking plank. This might have a particularly useful application when the decking plank forms part of a deck Located in the vicinity of the house which would activate an alarm when would-be intruders stand on the deck.

Figure 11:
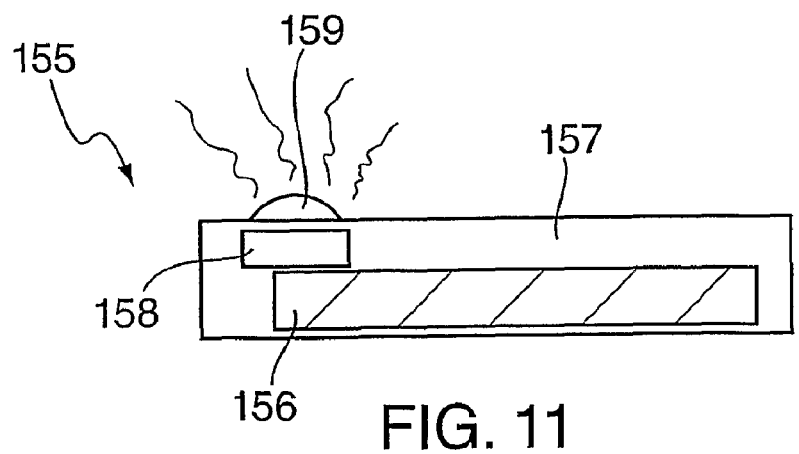
FIG. 11 shows a cross-sectional view of a decking plank in accordance with a further embodiment of the invention.

FIG. 11 shows a deck 155 with a supporting beam 156 and a covering layer 157. Within the covering layer there is provided a radio receiver 158 and a loudspeaker 159.

The process of manufacture of the previous decking planks may involve first the selection of an appropriate support beam such as an untreated wooden plank of decking following this first step, any appropriate electrical component may be placed onto the support beam prior to placing into a mould for casting material onto the support beam to achieve the dual protection of the support beam and electrical components. The mould may be provided with appropriate shapes to mimic antique wood, stone or terracotta tiles and to indicate the locations for inserting screws. Other suitable mould configurations may be envisaged.

Figure 12:
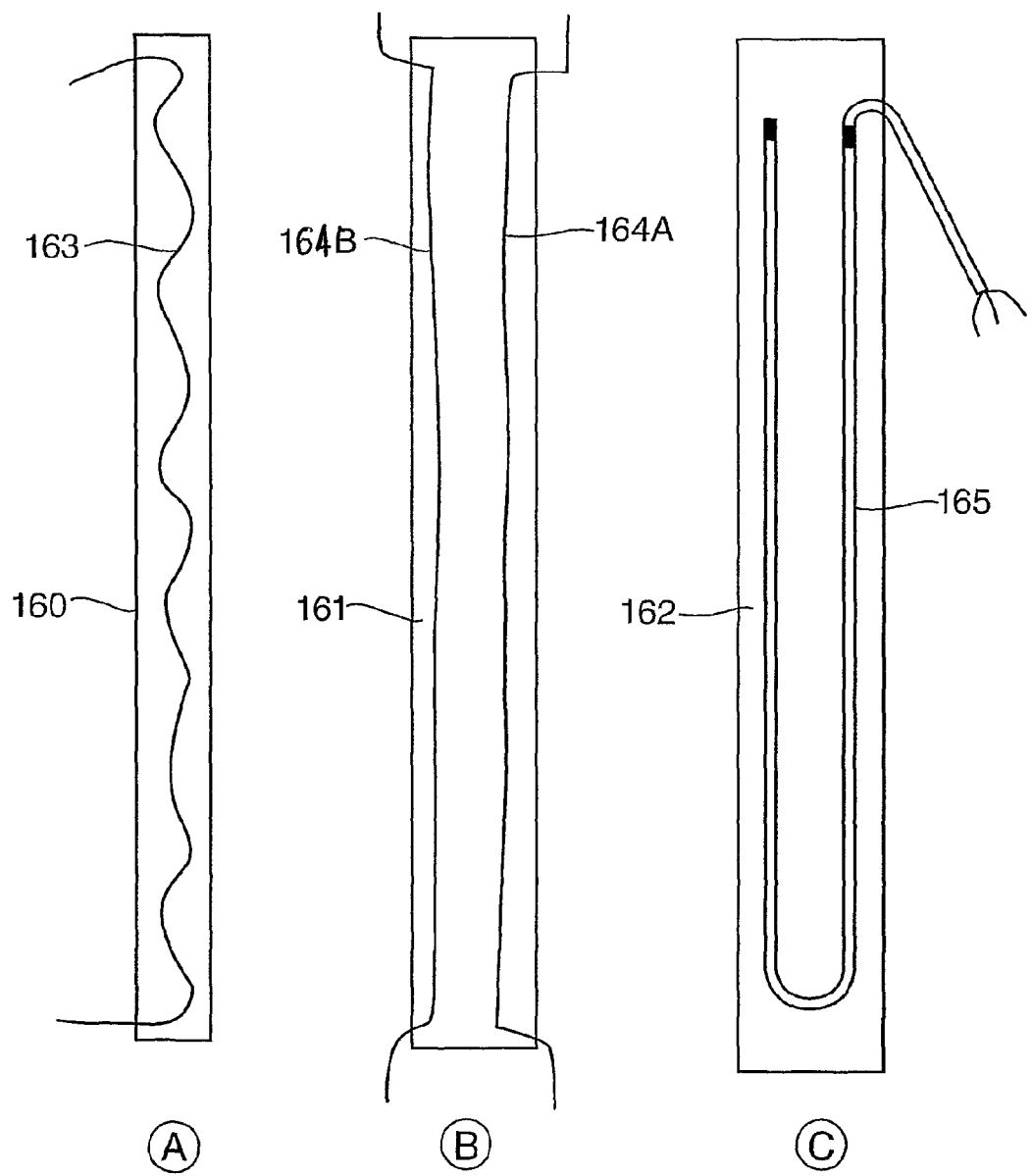
FIGS. 12a, b and c show a schematic plan view of decking planks equipped with heating wires. The decking planks of FIGS. 12a, b and c respectively show further embodiments of the invention.

FIGS. 12a, 12b and 12c show the support beams 160, 161 and 162 respectively on which heating wires 163, 164 and 165 are respectively placed. The wires may incorporate any number of undulations of, for example as in FIG. 12a, approximately ten undulations per metre. FIG. 12b shows two separate wires 164a and 164b extending in a straight line along the length of a relatively wide support beam. In FIG. 12c the electrical heating means 165 forms a C-shape. The heating means of FIG. 12c is provided in a parallel electrical configuration whilst the heating means of FIGS. 12a and 12b are provided in a series of electrical configurations.

It is also envisaged that a conduit such as a hollow tube may be cast in with the layers of plastics covering to allow heating cables to be slid through after the decking plank is formed.

Figure 18:
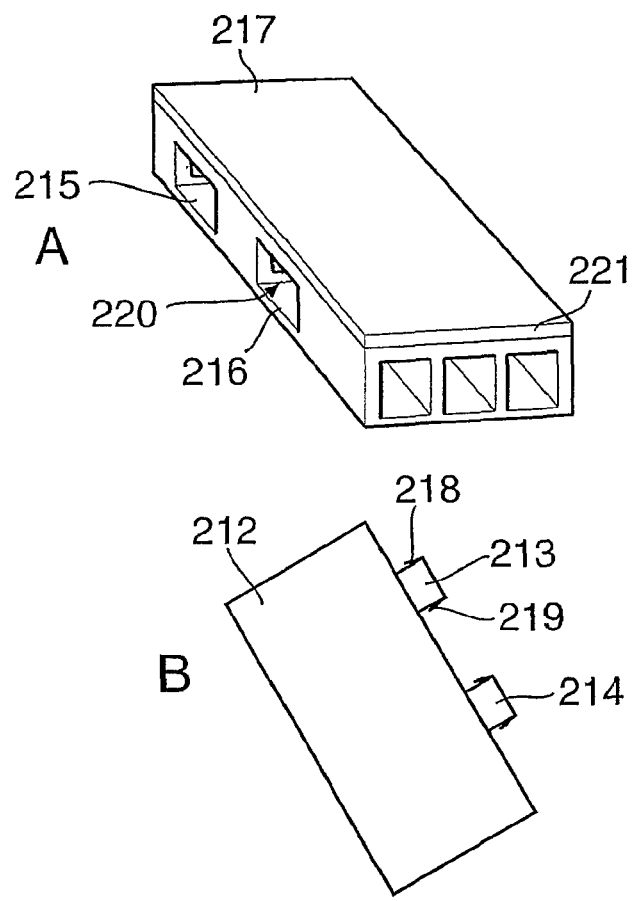
FIG. 18 show a cross-sectional view of a decking plank in accordance with a further embodiment of the invention.

FIGS. 18a and 18b show two portions of two decking planks where the projections of decking plank 212 such as projections 213 and 214, are sized and shaped to fit into corresponding recesses 215 and 216, located on the side of decking plank 217. Projections such as projection 213 incorporates lateral wings 218 and 219, which allow the projection to be locked in place when forced into a recess such as recess 216 where corresponding side cut-outs such as cut-out 220 are provided. In this embodiment, plank 217 incorporates a covering layer 221 of polyurethane of a thickness selected within the range 2 to 7 mm.

Figure 19:
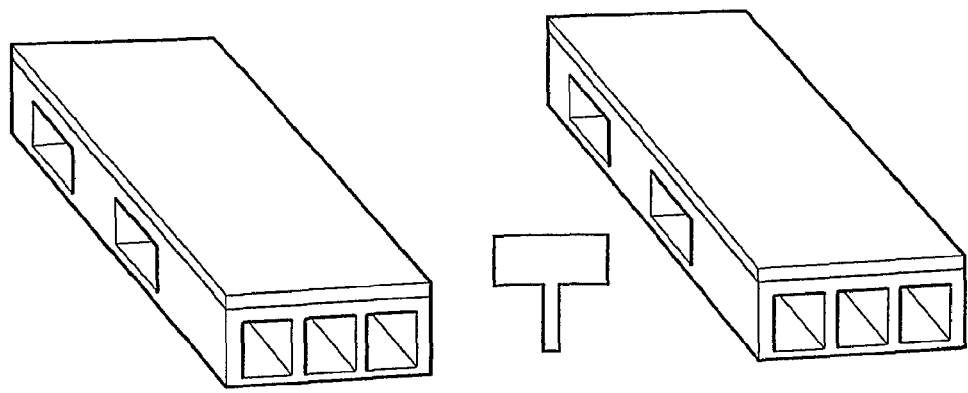
FIG. 19 shows a perspective view of two decking planks joined together by a T-junction member.

FIG. 19 shows two planks of the kind shown in FIG. 18a and a T-shaped member for insertion into apertures in the sides of the planks in order to secure them together in a so-called invisible manner.

Whilst the previous embodiments envisage in particular the use of resistance heating, it is also envisaged to use fluid heated decking such as water heated decking or hot air heated decking. It is envisaged that the decking boards incorporate pipes or an extruded hollow support that can not only support the board but act as a water/air manifold.

Figure 20:
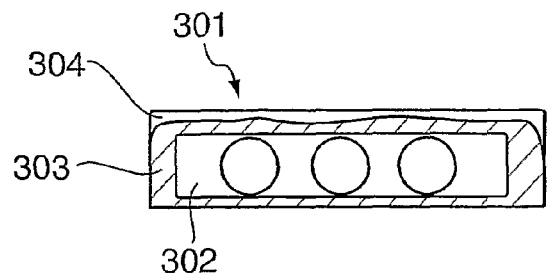
FIG. 20 shows a cross-sectional view of a decking board with channels for allowing the circulation of water/air.

FIG. 20 shows a board 301 with an extruded core region 302 with a number of tunnels to commit the flow of liquid or air so that the board can act as a heat exchanger. The core region is encapsulated in resin in region 303 and incorporates a relatively soft top layer 304.

Figure 21:
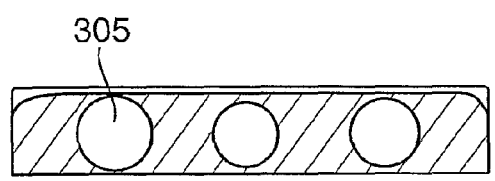
FIG. 21 show two cross-sectional views of a decking plank with pipes.
Figure 21:
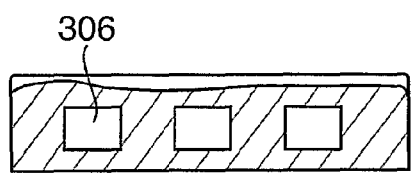

FIGS. 21a and b show two further embodiments of a heated decking board where pipes are cast into resin. The board of FIG. 21a shows round pipes 305 whereas the board of FIG. 21b incorporates square pipes 306.

Figure 22:
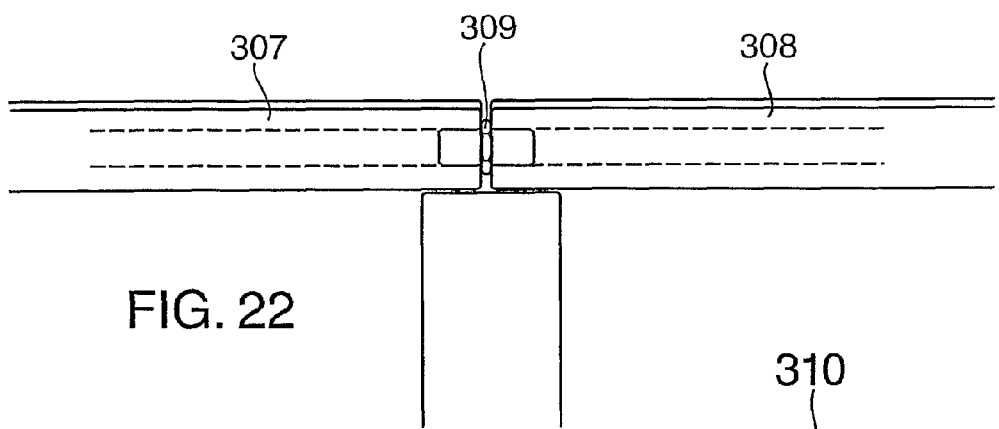
FIG. 22 shows a first embodiment of a junction mechanism for water/air flow decking boards.
Figure 23:
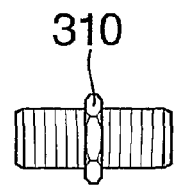
FIG. 23 shows a side elevation view of a threaded collar used in the junction mechanism of FIG. 22.

A wide variety of junction mechanisms are envisaged between neighbouring pipes or boards. For example, FIG. 22 shows two boards 307 and 308 supported on a joist at a junction region where a threaded collar 309 is incorporated. The threaded collar incorporates a flange 310 as shown in FIG. 23. It also incorporates threads on either side of the flange 310. Said threads on each side of the flange are envisaged to meet with hollow cores of two neighbouring boards at the same time. The flange may be faceted in order to allow screwing in with ease by the use of a spanner.

Figure 24:
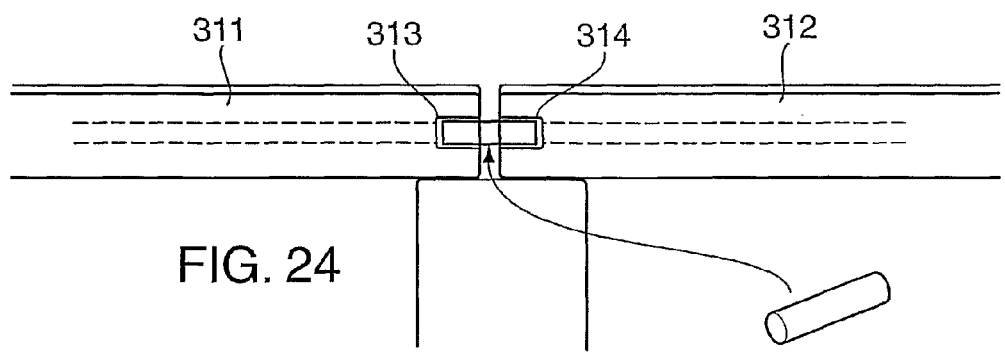
FIG. 24 shows a second embodiment of a junction mechanism.

FIG. 24 shows a further embodiment of the junction mechanism between two neighbouring boards 311 and 312. Each board incorporates a cast in connector 313 and 314 which permit a water tight attachment to a short tube which is slotted between the connectors.

Figure 25:
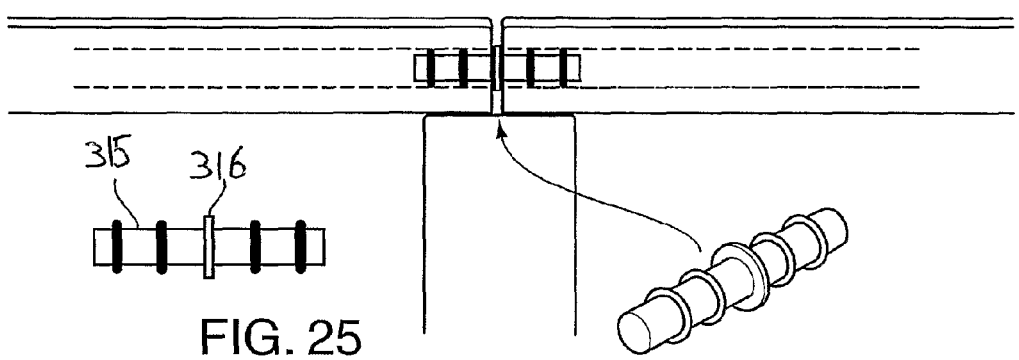
FIG. 25 shows a third embodiment of a junction mechanism.

FIG. 25 shows a further junction mechanism where encapsulated pipes or a hollow extruded support is envisaged and the connector is in the form of a tube 315 with an arrangement of O-rings such as O-ring 316 which are sized and shaped to provide a water tight attachment between the two decking boards.

Figure 26:
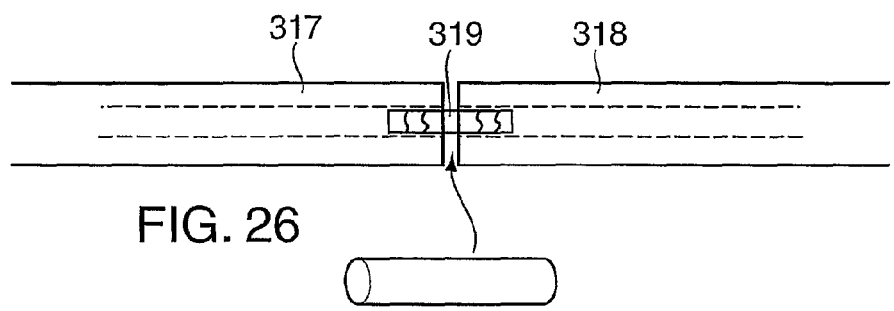
FIG. 26 shows a fourth embodiment of a junction mechanism.

FIG. 26 shows two neighbouring boards 317 and 318 and a tube 319 which is simply glued into the channels provided in each decking board.

Figure 27:
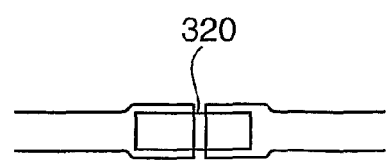
FIG. 27 shows a fifth embodiment of a junction mechanism.

FIG. 27 shows the ends of manifold pipes with greater diameters at their connecting extremities in order to locate a pipe 320 which may be glued into position. It is envisaged that the connector pipes may or may not be flexible.

The invention also envisages that the fluid flowing in the decking boards may either be heated or cooled in order to act either as a heater or as a cooler. The invention envisages that optionally the decking may be located around a swimming pool in the summer and a pump may be positioned between the decking boards and the water of the swimming pool so that the decking boards may be cooled and simultaneously the water of the swimming pool may be heated by the arrangement.

Plastic pipes (possibly 2) cast in the covering layer acts as both a support beam as well as a fluid conduit.

The invention claimed is:

1. A decking plank comprising a core comprised of plastics material and reinforcing fibers; said core acting as a support beam; at least one covering layer covering at least a portion of the core; wherein said covering layer and said core meld together such that the covering layer and the core act as an adhesive to one another, said at least one covering layer incorporating an exposed relief; whereby said at least one covering layer forms an outer slip resistant covering layer; wherein said covering layer consists of an elastomer and a particulate filler which form a homogeneous layer; said at least one covering layer having less filler than said core and being relatively soft compared to said core which is relatively hard; whereby the core acts as a support beam whilst said at least one layer has a cushioning effect.

2. A decking plank according to claim 1, wherein said plank incorporates a heat exchanger.

3. A decking plank according to claim 2, wherein said plank incorporates at least one tunnel for circulating fluid through said plank.

4. A decking plank according to claim 3, wherein said tunnel incorporates an outlet which is configured to facilitate the attachment to a neighbouring plank.

5. A decking plank according to claim 1, wherein said elastomer is polyurethane based.

6. A decking plank according to claim 1, wherein said core incorporates at least one pipe.

7. A decking plank according to claim 1, wherein said core is of extruded or pressed plastics with tunnels through said core.

8. A decking plank according to claim 1, wherein said plank has at least a top surface and a side surface which are covered by said covering layer.

9. A decking plank according to claim 1, wherein said core is entirely encapsulated by said covering layer which has a cushioning effect.

10. A decking plank according to claim 1, further comprising multiple lateral projections on at least one side of the plank and recesses on at least one opposite side of the plank for mating engagement with the lateral projections of another plank.

11. A decking plank according to claim 1, wherein said plank further comprises heating means.

12. A decking plank according to claim 1, wherein at least one side of the plank incorporates a groove.

13. A decking plank according to claim 1, wherein the core has a top surface, an opposing bottom surface and a pair of opposing side surfaces extending therebetween, the covering layer only covering the top surface of the core.

14. A decking plank according to claim 1, wherein the particulate filler comprises fuel ash or calcium carbonate.

* * * * *